United States Patent [19]

Templin

[11] 3,835,379

[45] Sept. 10, 1974

[54] DETECTOR CIRCUITS FOR SIGNAL TRANSMISSION

[75] Inventor: Lawrence R. Templin, La Mirada, Calif.

[73] Assignee: Hughes Aircraft Company, Culver City, Calif.

[22] Filed: Jan. 28, 1974

[21] Appl. No.: 437,430

Related U.S. Application Data

[62] Division of Ser. No. 251,232, May 8, 1972, Pat. No. 3,794,941.

[52] U.S. Cl. .............................. 324/58 B, 328/135

[51] Int. Cl. ........................................... G01r 27/04

[58] Field of Search ............ 324/58 B, 58.5 B, 58 R, 324/57 R; 328/135

[56] References Cited

UNITED STATES PATENTS 3,020,529 2/1962 Turner ......................... 324/58 B X

*Primary Examiner*—Stanley T. Krawczewicz

*Attorney, Agent, or Firm*—W. H. MacAllister; Richard J. Rengel

[57] ABSTRACT

Standing wave ratio (VSWR) detector provides sensing and monitoring of antenna tuning for broad band signal transmission of 2 to 80 MHz by sampling of forward and reflected signals to produce a digital output for indicating high and low standing wave ratios. A load sensor provides for sampling of transmission by detecting a plurality of impedance levels for preload and tuning after selection of the preload reactance. Each impedance level has a digital output for indicating the desired pre-load reactance and a digital output for the tuned reactance. The load sensor operates concurrently with a phase sensor in different control loops to select inductive and capacitive reactances of the antenna impedance matching network to approach the desired load resistance and 0° phase condition. The tuning is continuously monitored by the VSWR detector for initiating and controlling the duration of tuning cycles according to the detected impedance matching condition to provide at least a 1.5:1 ratio.

6 Claims, 3 Drawing Figures

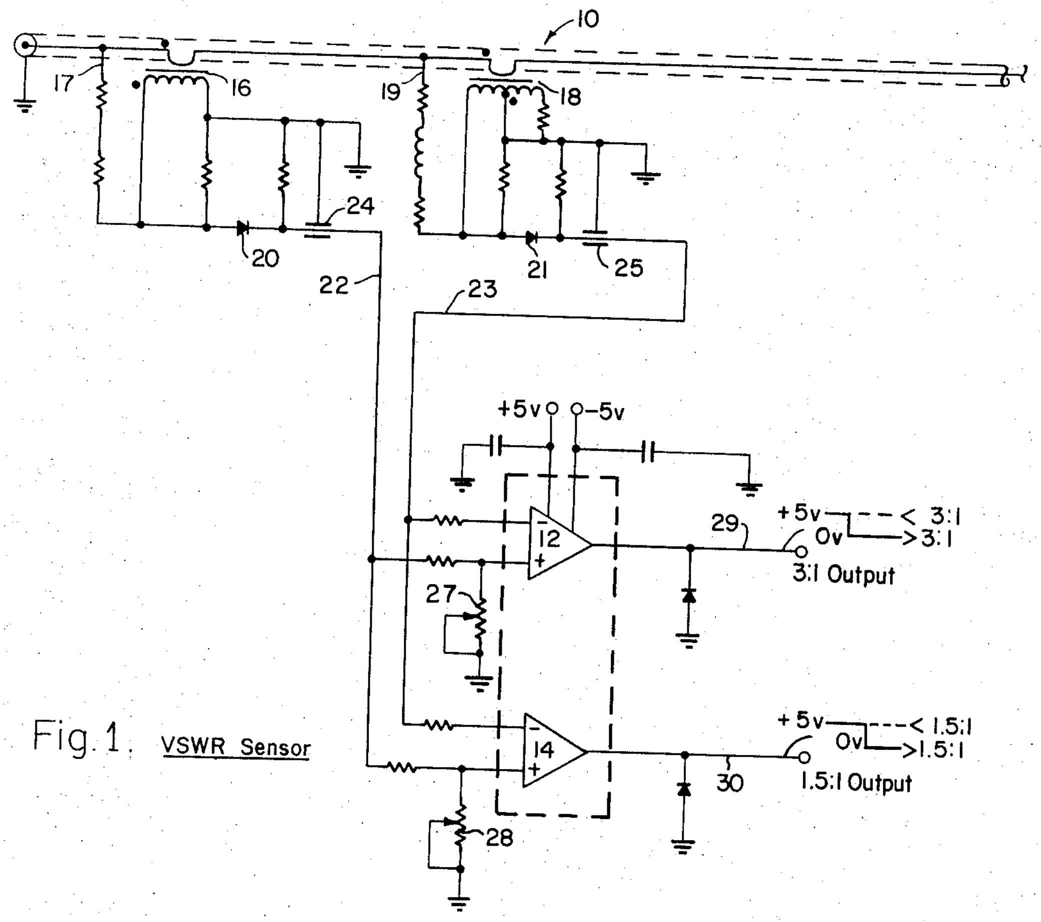
Fig. 1. VSWR Sensor
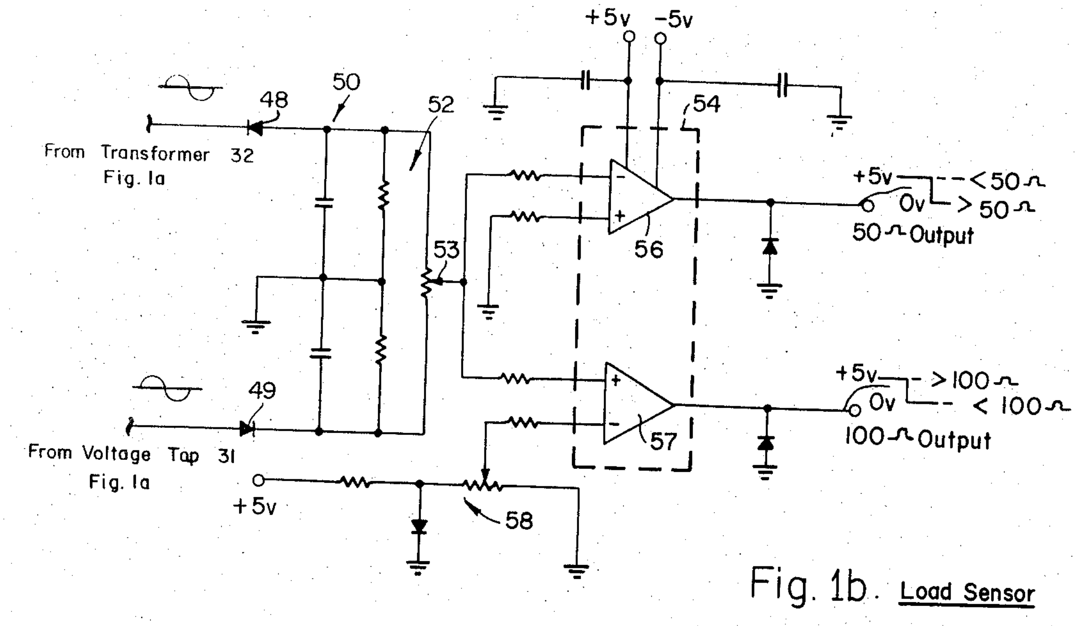
Fig. 1b. Load Sensor

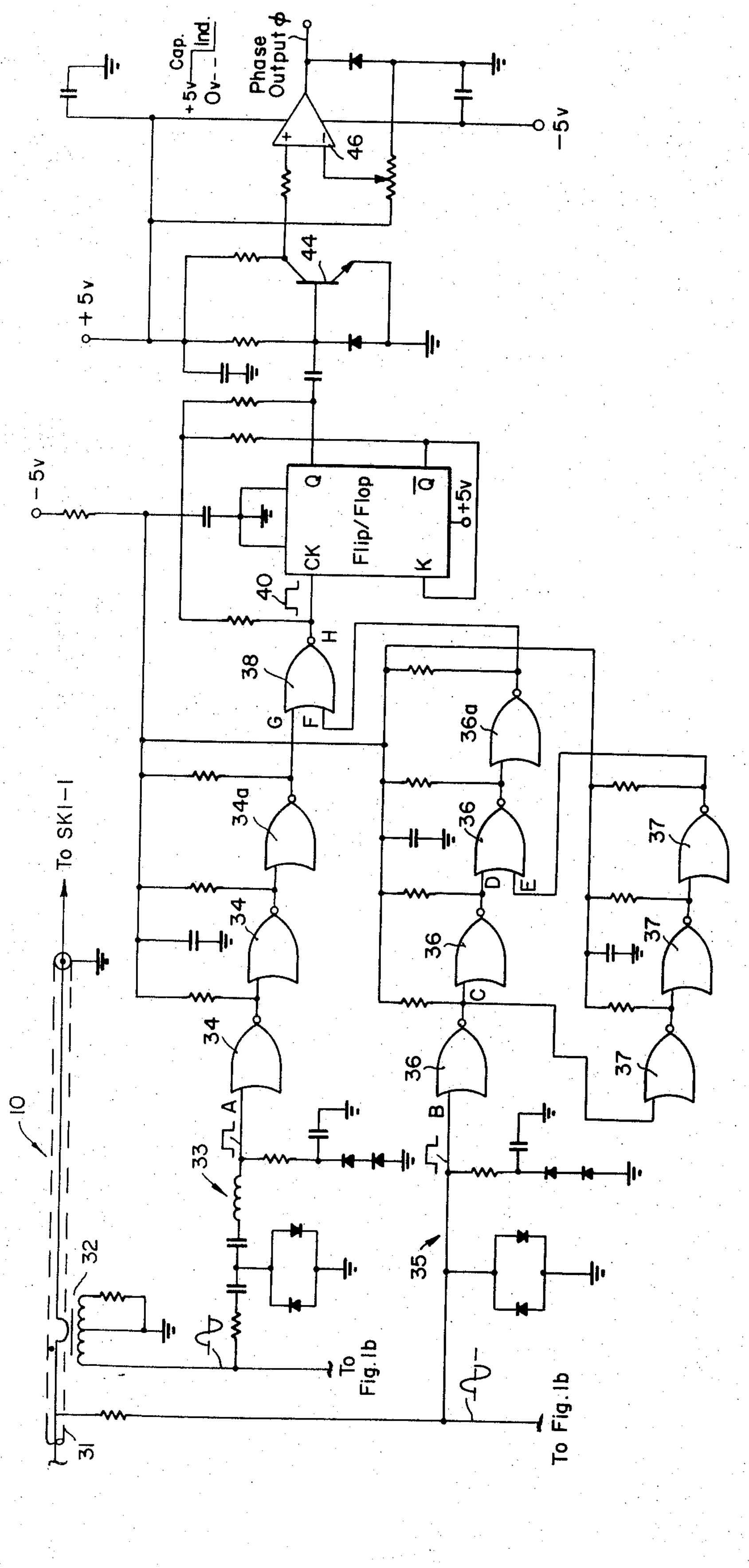
Fig.1a. Phase φ Sensor

DETECTOR CIRCUITS FOR SIGNAL TRANSMISSION

This application is a division of copending U.S. application Ser. No. 251,232, filed May 8, 1972, now U.S. Pat. No. 3,794,941 issued Feb. 26, 1974.

BACKGROUND OF THE INVENTION

In order to provide an efficient transfer of power from the power amplifier of a radio transmitter to its antenna, antenna tuning must be provided to achieve the efficient power transfer. Accordingly, the function of the antenna tuner is to transform the impedance of the antenna to the load reactance required for the power amplifier output stage of the transmitter.

One of the difficulties of the prior art is to provide sampling for sensing of the condition of tuning over the frequency band for tuning without changing the tuning condition, i.e. deriving voltage and current samples of adequate level for sensing without becoming a significant load over the frequency range of tuning.

Another difficulty of the prior art ratio detectors was to provide for sensing of standing wave ratios over a broad frequency band e.g. 2 to 80 MHz, or to provide digital standing wave ratio outputs.

In detection of antenna loads, the prior art difficulty was also to provide sensing of impedance over a broad frequency band e.g. 2 to 80 MHz or to provide digital outputs including outputs for control of load impedance of antenna matching networks.

SUMMARY OF THE INVENTION

In the preferred embodiment of the automatic tuner of the present invention, a completely automatic tuner has been provided that matches accurately any one of five different antenna configurations, for example, to the output of the transmitter power amplifier.

A VSWR detector provides information relative to the tuned condition having been reached and remains operative during all transmission intervals. The monitoring of the tuner by the VSWR detector also provides for inhibiting high power during a period of transmission should a subsequent mismatch arise in the tuner, for example, due to a change of position of the transceiver.

Individual phase and load sensors are provided to detect voltage and current samples of the transmitted signal to provide positive and negative decisions with regard to phase, and impedance above or below either 100 ohm or 50 ohm impedance references, respectively. The 100 ohm reference is provided for selecting a proper preload reactance for preloading the selected antenna below 50 MHz of the broad frequency range of 2 to 80 MHz. The preload arrangement consists of a rotary switch which is indexed in response to the sensor outputs and the indexing continues until a reactance selected provides the L matching network with an antenna input impedance of approximately 100 ohms. After the proper preload impedance is obtained, the phase and 50 ohm impedance load sensor outputs provide logic level outputs to direct the relay control logic to insert and remove both inductance and capacitance elements in a binary sequence in the L matching network to provide the proper combination, out of $2 \times 10^6$ possible combinations, for at least a 1.5:1 VSWR operating condition which is detected by the VSWR sensor.

The selected method for control of the tuning circuit elements requires two inputs, i.e., phase and impedance inputs indicative of the reactive condition of the selected antenna. The phase input is provided by the phase sensor which supplies a digital signal to the logic control circuits for switching capacitors in the antenna impedance matching network. The other control loop is responsive to the detected impedance provided by the load sensor which directs the logical control to switch the inductors in the antenna impedance matching network. The phase and impedance control loops are quasi-independent and are capable of operating simultaneously to reduce the time period of the tuning cycle. Since the inductive and capacitive elements are incremented in value digitally, the logical control is operated in a binary counting sequence, i.e., individual counters for inductive and capacitive components control the switching for insertion and removal of the individual capacitors and inductors in the impedance matching networks.

In view of the foregoing, it is an object of the present invention to provide a phase sensor and an impedance load sensor and standing wave ratio detector for an antenna tuner having the foregoing features and advantages.

Another object is to provide for sensing standing wave ratio of signal transmission.

A further object is the provision of a load sensor for detecting the impedance of signal transmission.

Still another object is to provide for monitoring the tuning of signal transmission.

Another object is to provide digital outputs indicative of standing wave ratio and load impedance for controlling the tuning of an antenna for signal transmission over a broad frequency band.

Other objects and features of the invention will become apparent to those skilled in the art as the disclosure is made in the following detailed description of a preferred embodiment of the invention.

BRIEF DESCRIPTION OF THE DRAWINGS

FIG. 1 is a circuit diagram of a standing wave ratio sensor of the preferred embodiment of the present invention for detecting the voltage standing wave ratio in an antenna coupling and tuning network for initiating and controlling the duration of a tuning cycle;

FIG. 1*a* is a diagram of a phase sensor of the preferred embodiment for sensing the phase of the reactive component in the antenna coupling network and providing control signals for tuning to eliminate any excessive reactive antenna component; and FIG. 1*b* is a circuit diagram of a load sensor for detecting antenna impedance components for controlling the inductive reactance in a tuning cycle of the preferred embodiment of the present invention.

Referring now to the drawings, FIGS. 1, 1*a* and 1*b* illustrate schematically VSWR, phase and load impedance sensing circuits for automatic sensing of antenna parameters including selected antenna frequency preload requirements. In general, these circuits provide broad band coverage of frequencies from 2 to 80 MHz for antennas of widely differing impedance and each having substantial impedance excursions over the band of frequencies, e.g., varying impedance characteristics in the range of 60 ohms to 1,500 ohms at about 26 MHz for 6 and 9 foot whip antennas. Two of the sensing circuits, the phase and load sensors shown in FIGS. 1*a* and 1*b*, provide independent and simultaneous detection of impedance and phase antenna parameters to provide digital control signals for individual steering of logic circuits controlling capacitive and inductive tuning elements, respectively. The remaining sensor (VSWR) monitors the antenna voltage standing wave ratio for starting and terminating tuning cycles, for transmission in the frequency range of the broadband frequency coverage.

Accordingly, the sensing circuits of FIGS. 1, 1*a* and 1*b* are directed to detecting selected antenna conditions at any selected operating frequency to produce feedback control signals for steering of logic circuits for digital sequencing of reactive components for tuning. Further, to satisfy the need for rapid tuning over a wide range of transmission frequencies, e.g., 2 MHz to 80 MHz, tuning is implemented by parallel sequencing of capacitive and inductive tuning elements in the high frequency (HF) band of 2–50MHz. The phase and load sensors of FIGS. 1*a* and 1*b* independently analyze the impedance and phase components of the selected antenna and provide separate control signals to the logic control circuits for concurrent sequencing of the capacitors and inductors in the tuning circuit to provide a tuned condition at any selected transmission frequency.

As shown in FIGS. 1, 1*a* and 1*b*, low power, voltage and current carrier wave signals are coupled to each of the sensors from line taps on a transmission line 10 which is connected to an RF amplifier, requiring a 50 ohm output impedance for transmission over the broadband frequency range of 2 to 80 MHz. The transmission line tap interruptions are preferably contained in a minimum length of line so that the sample input signals track over the frequency range. In general, the circuitry and packaging of the sensors maintain minimum losses to enhance the broadband frequency transmission range. For example, the transmission line 10 comprises a coaxial cable one-half inch in length with voltage taps and toroidal transformers located within the length of the cable. Due to the transmission line taps and interruptions being contained in the minimum line length, sampled voltages track over the frequency range due to minimum change in losses or voltage level which directly effect the linearity and sensitivity of the sensors' outputs.

In FIG. 1 the VSWR sensor is shown to provide two outputs, namely, 3:1 and 1.5:1 outputs from respective operational amplifiers 12 and 14, each supplied voltage and current samples of the transmitted signal at the respective voltage and transformer couplings to the transmission line 10. Coupling transformers 16 and 18 are of opposite polarity to provide forward and reflected current signal samples. Signals from coupling transformer 16 and a DC voltage tap 17 are combined to produce a positive detected voltage corresponding to the forward transmission signal on transmission line 10. Signals from the other pair, coupling transformer 18 and voltage tap 19, are combined to produce a positive detected voltage corresponding to the reflected transmission signal on the transmission line 10. Diodes 20 and 21, in combination with their respective associated load resistors, produce the positive detected voltage on respective lines 22 and 23 for the forward and reflected signal samples. An AC filter is provided by capacitors 24 and 25 which are coupled to ground as shown to provide positive DC signals to the VSWR sensor.

The derived forward signal on line 22 is applied to the positive inputs of the dual DC operational amplifiers 12 and 14 and the derived reflected signal on line 23 is applied to the negative inputs. Each positive input of the dual operational amplifiers includes respective voltage dividers 27 and 28 for adjusting the threshold level of the respective amplifiers. Filtered voltage supplies of +5 and −5 volts are coupled to both of the amplifiers as shown for amplifier 12, and the outputs are limited by diodes coupled to output lines 29 and 30. Operational amplifier 14 provides the 1.5:1 VSWR output wherein the higher level of the control signal indicates a voltage standing wave ratio of 1.5:1 or less for terminating the tuning cycle. As long as this 1.5:1 output remains at the lower logical level (Ov), the tuning cycle will continue as controlled by digital control circuitry in response to phase and impedance sensor outputs as described later.

The other control signal output from operational amplifier 12, on output line 29, provides a low logical level control signal indicating the voltage standing wave ratio of greater than 3:1 which can be used to signal the operator to begin the new tuning cycle or alternatively can provide a start signal for initiating a tuning cycle.

Referring now to 1*a*, the circuit for detecting the phase of the antenna impedance is designated the phase sensor which derives voltage and current (voltage) signal samples from the transmission line at voltage tap 31 and current transformer 32. As in the VSWR sensor of FIG. 1, a low power carrier wave signal (e.g., 2 watts) is required to provide sensor input signals. The voltage sample taken at tap 31 of transmission line 10 is applied undetected to the phase sensor of FIG. 1*a* and is also coupled to the load sensor of FIG. 1*b* after detection. Also, as discussed in connection with the VWSR sensor of FIG. 1, the transformer 32 is connected in series with the transmission line 10 for extracting a sample for detecting any phase of the antenna reactance by the phase sensor of FIG. 1*a* and is also applied to the load sensor of FIG. 1*b* after detection.

In the phase sensor, FIG. 1*a*, the signal supplied by the transformer 32 is capacitively coupled through an isolation network 33 to a series of three NOR gates 34. These gates 34 and the remaining gates shown in FIG. 1*a* provide fast rise times and constant amplitude pulse waveforms over the full frequency range of operation. A gate of this type is supplied by Motorola Semiconductor Division as a "MECL III" gate.

The other input to the phase sensor is the voltage sample supplied from the voltage tap 31 which is coupled into the phase sensor through a constant load network 35. This voltage sample is then coupled to a gating arrangement including NOR gates 36 and 37 to produce a fixed delay which delayed signal is applied to input F of a summing gate 38.

The output of summing gate 38 is applied to clock input CK of flip flop 42 having interconnected J-K inputs which provide a pulse output Q at one-half the input pulse rate. While the pulse rate is decreased, the circuit gain is increased to control a driver 44 which is AC coupled to the output Q. The output of the driver 44 is applied to the + input of a high gain DC operational amplifier 46 having a − input which is coupled to a threshold adjustment to compensate for individual circuit parameters and to precisely place the threshold level at 0°. The positive input to operational amplifier 46 integrates the pulse train input to provide the digital output signal as shown, in which the high logical level (+5v) is indicative of a capacitive antenna load (−φ) and the low logical level (Ov) is indicative of an inductive antenna load (+φ).

Operational amplifier 46 has a high gain and implemented for fast crossover from capacitive to inductive levels, i.e., occurs within + or −6° about the in phase or 0° phase differential over the broad band frequency range. As noted earlier, the transmission line taps and interruptions are contained in a minimum line length, e.g., preferably ½ inch, and less than three-quarters of an inch, to provide for sample signals from transmission line 10 which track over the frequency range of 2–80 MHz. Any change in losses or voltage level directly affects the linearity and sensitivity of the sensor outputs.

Referring to FIG. 1*b*, the load sensor is supplied sample signals from voltage tap 31 and transformer 32 on transmission line 10. Whereas the phase sensor independently analyzes the phase angle of the antenna load, the load sensor shown in FIG. 1*b* is responsive to the sample signals from transmission line 10 to analyze the impedance component of the antenna load under the phase conditions to provide a separate control signal to the inductive sequence logic for insertion of inductive elements including tuning transformers in a T matching network for an antenna which may include a preload section of the T network.

The input circuit to the load sensor detects transformer and voltage tap signals. The two signals are diode detected in opposite senses by diodes 48, 49 in the input circuit 50, which detected signals are summed in a common load 52. The voltage level at adjustable tap 53 of the load resistor is applied to opposite inputs of a dual DC operational amplifier 54 including amplifiers 56 and 57. The voltage from tap 53 is applied to the − input of amplifier 56 to provide a digital output having a high logical level (+5v) indicating an antenna load of less than 50 ohms and a low logical level (Ov) indicating an antenna load of greater than 50 ohms. The 50 ohm output is a command signal which can be applied to the inductive sequence logic of the high frequency of digital control circuits.

The voltage level at tap 53 is applied to the + input of amplifier 57 to provide a digital signal at the 100 ohm output wherein the high level signal indicates an antenna load of greater than 100 ohms and the lower level signal indicates an antenna load of less than 100 ohms. This digital signal from the 100 ohm output is a command signal from the load sensor to antenna preload control circuits of an antenna tuner. The negative input to the amplifier 57 is coupled to a threshold adjustment circuit 58 to provide an offset bias whereby the circuit operation can be adjusted precisely to detect a 100 ohm impedance and produce a change in level at the output at 100 ohms.

The time period required for tuning is minimized by the use of automatic sensing of antenna parameters and any preload requirement. By parallel sensing of phase and impedance parameters by individual sensors, a tuning cycle is substantially reduced including an average preload tuning time interval of one-half (½) second and an L matching network tuning time interval of 0.8 second, or a total average time period of a tune cycle of 1.3 seconds. At the present time, reduction of time period of the tuning cycle is limited primarily by relay activation time and as solid state devices become available, which can tolerate the resonant power conditions, the tuning cycle time period will be decreased substantially.

One of the more important features of the present invention is the broad frequency range of the sensing circuits, particularly, the monitoring of the antenna reactances continuously to provide a rapid, flat response over the full frequency range enabling accurate tuning to voltage standing wave ratios (VSWR) of less than 1.5:1. Also, independent and simultaneous sensing and control of the real and reactive antenna components reduces the time period of the tuning cycle approximately 50 percent. Accordingly, in addition to having the individual sensing circuits, separate logical control circuits for controlling the inductive and capacitive tuning elements is derived from the two independent phase and load sensors whose operation is quasi-independent.

The provision of broad band sensor circuits is important in providing for monitoring of antenna reactances continuously while also providing rapid, flat response over the entire frequency range for accurate tuning to a standing wave ratio of less than 1.5:1. Further, independently and simultaneously sensing and switching of the real and reactive antenna components reduces the tuning time approximately 50 percent. This is accomplished by having two identical logic control circuit loops; one controlling the inductive and the other controlling the capacitive tuning elements as described in detail in my original application. The controlled inputs to these circuits are derived from two independent phase and impedance sensors.

The tuning cycle, therefore, is initiated only if the standing wave ratio, as sensed, is out of the acceptable limits, for example, 3:1. Upon determining that the standing wave ratio is greater than 3:1 a preload switch assembly is cycled and stopped at the first position at which a 100 ohm impedance crossover is sensed and the phase angle appears inductive +φ. After the preload sequence, HF control logic cycles relay control inductive and capacitive elements through their values in binary increments simultaneously as directed by the phase and impedance sensors. The HF control circuits seek a zero (0) phase angle and an antenna impedance of 50 ohms. As the phase and impedance is approached in the L-C combination, providing a standing wave ratio of less than 1.5:1 produces the VSWR output of 1.5:1 for terminating the tuning cycle, disconnecting the tuning power and providing an output for increasing the transmission power to a high level.

The basic tuning algorithm disclosed includes many improvements as disclosed by the preferred embodiment, and the relay control matrix and the sensors can be simplified or combined in any configuration as needed for the particular tuning requirements of the system under consideration.

Thus, at the time the tuning cycle is initiated, if the standing wave ratio is within the limits specified, the system automatically switches to high power transmission without tuning. On the other hand, if the standing wave ratio as sensed is out of limits, the tuning cycle is initiated. Normally the transceiver is provided with a tune switch, e.g., the microphone key and tuning is completed by the time the operator commences talking because of the short time interval of less than 3 seconds required for the tuning cycle. In the event a tuned condition cannot be attained which satisfies the standing wave ratio limits, the cycle is terminated and an indication is provided to the operator that the system has not been tuned. Also during monitored transmission, if the standing wave ratio exceeds the allowable limits, a command line is energized for signalling the operator.

In the light of the above teachings of the preferred embodiment disclosed, various modifications and variations of the present invention are contemplated and will be apparent to those skilled in the art without departing from the spirit and scope of the invention. Many of these variations have been discussed and as was noted, the particular application of the present invention to specific applications often determines the arrangement for simplification.

I claim:

1. A standing wave ratio detector providing broad band sensing of standing wave ratios of signal transmission comprising:

circuit sampling means for sampling of forward and reflected signals of transmission; and circuit means for combining said samples of forward and reflected signals including operational amplifiers, individual amplifiers of said amplifiers including circuit means for providing adjustable threshold levels, the level of one of said amplifiers being adjusted to provide a logical level output signal for a high standing wave ratio and another of said amplifiers being adjusted to provide a logical level output signal for the opposite low standing wave ratio.

2. A standing wave ratio detector according to claim 1 in which said broad band includes the HF band and extends into the VHF band to approximately 80 MHz.

3. A standing wave ratio detector according to claim 1 in which the circuit sampling means includes transformer means for lightly coupling to the signal transmission.

4. A standing wave ratio detector according to claim 1 in which said operational amplifiers comprise dual operational amplifiers.

5. A load impedance sensor for broad band signal transmission comprising:

circuit means for individual sampling of voltage and current of a continuous wave signal being transmitted;

combined circuit means including means for detecting and balancing network means including means for combining detected voltage and current samples; and operational amplifiers including individual amplifiers having adjustable threshold levels, one of said amplifiers being adjusted in threshold level to provide logical level signals for a predetermined high impedance load condition and another amplifier being adjusted in threshold level to provide logical level signals for a predetermined low impedance load condition.

6. A load impedance sensor of claim 5 in which said operational amplifiers are dual operational amplifiers.

* * * * *